Figure 1:
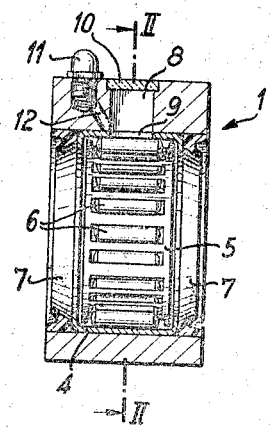

April 25, 1967 G. SCHAEFFLER 3,316,037
NEEDLE BEARINGS FOR BOTTOM ROLLERS OF
STRETCHERS IN SPINNING MACHINES
Filed Dec. 18, 1964

INVENTOR

GEORG SCHAEFFLER

BY

*Hammond & Littell*

ATTORNEYS

United States Patent Office 3,316,037
Patented Apr. 25, 1967

3,316,037
NEEDLE BEARINGS FOR BOTTOM ROLLERS OF STRETCHERS IN SPINNING MACHINES
Georg Schaeffler, Herzogenaurach, near Nurnberg, Germany, assignor to Industriewerk Schaeffler o.H.G., Herzogenaurach, Germany, a corporation of Germany
Filed Dec. 18, 1964, Ser. No. 419,378
Claims priority, application Germany, Jan. 23, 1964, J 12,363
4 Claims. (Cl. 308—187)

The invention relates to a novel needle bearing for bottom rollers of stretchers in spinning machines comprising a housing with a rectangular upper part and a semi-cylindrical lower part with a bore therein, a race preferably made of sheet metal pressed into the bore and needles accommodated and guided in a cage on the said race.

Bearings of this type are known and are easily placed in U-shaped recesses of bearing perforations of spinning machines without requiring additional mounting elements. For lubrication, prior art bearings have a grease fitting in their upper part connected with the interior of the bearing by a bore passing through the said upper part and the ball race. However, this means of lubrication has not been satisfactory because it is necessary to frequently lubricate these bearings due to the small amount of lubricant that the bearing can absorb. Another greater disadvantage is that it cannot be determined from the outside when the lubricant supply is exhausted and additional lubricant is needed. Also, there is the danger of excess lubrication which may cause the lubricant to leak from the bearing and thereby soil the material being spun.

It is an object of the invention to provide a needle bearing for bottom rollers of stretchers in spinning machines which require less frequent lubrication.

It is another object of the invention to provide a needle bearing for bottom rollers of stretchers in spinning machines in which it can be determined from the outside when lubrication is required.

These and other objects and advantages of the invention will become obvious from the following detailed description.

The needle bearing of the invention for the bottom rollers of stretchers of spinning machines is comprised of a housing with a rectangular upper part and a semi-cylindrical lower part with a bore therein, a needle race pressed into the said bore and needles accommodated and guided in a cage on the said race, the said upper part having a hollow space for storing lubricant connected with the bearing interior by a break in the said race. The break in the race may be a series of perforations or a complete gap in the race. The hollow space increases the amount of lubricant the bearing can absorb and greatly increases the time between lubrications of the bearing as compared to the prior art bearings.

The said hollow space is preferably sealed at the top with a transparent plate so it is possible to determine from the outside if there is still lubricant therein or if more lubricant is required without removing the plate. In order to lubricate the bearing, it is preferred to provide a grease fitting in the upper part of the housing connected to the said hollow space by a bore.

Referring now to the drawings:
FIG. 1 is a longitudinal cross-sectional view of one embodiment of the bearing of the invention and FIG. 2 is a cross-sectional view of the bearing of FIG. 1 along the line II—II.

Figure 2:
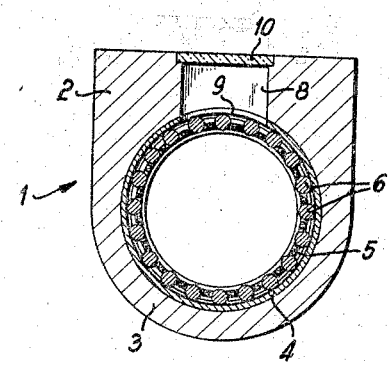

In the embodiment illustrated in FIGS. 1 and 2, the bearing is comprised of a housing having a rectangular shaped upper part 2 and a semi-cylindrical shaped lower part 3 with a bore therein, a race 4 of the needle bearing pressed into the bore disposed in the lower part of the housing and cage 5 for accommodating and guiding needles 6 on the race 4. If desired, elastic lip-sealing means 7 may be arranged on both ends of the race 4. A hollow space 8 is provided in the upper part 2 of the housing 1 and serves as a storage space for the lubricant. The hollow space 8 is connected with the bearing interior by a break 9 in race 4 and is sealed off at its top by a transparent plate 10 whereby control of the lubricant storage is possible from the outside. A grease fitting 11 is disposed in the upper part 2 of the housing 1 and is connected with the hollow space 8 by a bore 12 which serves as a relubricating means.

It is not necessary that the size of the break 9 in race 4 corresponds exactly with the cross-sectional area of the recess 8 and it may be made much smaller. However, in most cases it is more practical for break 9 to be of greater dimensions than the hollow space 8 so that the entry leading into the entry of the bearing interior will be that of the cross-sectional area of the hollow space even if the race 4 rotates while being pressed into the bore of housing 1.

Various modifications of the bearing of the invention may be made without departing from the spirit or scope thereof and it is to be understood that the invention is to be limited only as defined in the appended claims.

I claim:
1. A needle bearing for the bottom rollers of stretchers of spinning machines comprising a housing with a rectangular upper part and a semi-cylindrical lower part with a bore therein, a thin-walled needle race pressed into the said bore and needles accommodated and guided in a cage on the said race, the said upper part having a hollow space for storing lubricant connected with the bearing interior by a break in the said race and sealed at the top with a transparent plate.

2. A needle bearing for the bottom rollers of stretchers of spinning machines comprising a housing with a rectangular upper part and a semi-cylindrical lower part with a bore therein, a thin-walled needle race pressed into the said bore and needles accommodated and guided in a cage on the said race, the said upper part having a hollow space sealed at the top for storing lubricant connected with the bearing interior by a break in the said race and having a grease fitting disposed in the upper part connected to the said hollow space by a bore.

3. A needle bearing for the bottom rollers of stretchers of spinning machines comprising a housing with a rectangular upper part and a semi-cylindrical lower part with a bore therein, a thin-walled needle race pressed into the said bore and needles accommodated and guided in a cage on the said race, the said upper part having a hollow space for storing lubricant sealed at the top with a transparent plate and connected with the bearing interior by a break in the said race and a grease fitting disposed in the upper part connected to the said hollow space by a bore.

4. A needle bearing for the bottom rollers of stretchers of spinning machines comprising a housing with a rectangular upper part and a semi-cylindrical lower part with a bore therein, a thin-walled needle race pressed into the said bore, needles accommodated and guided in a cage on the said race and elastic lip-sealing means at both ends of the race, the said upper part having a hollow space for storing lubricant sealed at the top with a transparent plate and connected with the bearing interior by a break in the said race and a grease fitting disposed in the upper part connected to the said hollow space by a bore.

References Cited by the Examiner

UNITED STATES PATENTS

| | | | |
|---|---|---|---|
| 1,154,444 | 9/1915 | Shellberg | 308—187 |
| 1,923,799 | 8/1933 | Rockwell | 318—217 |
| 3,120,983 | 2/1964 | Sommer | 308—187.1 |

MARTIN P. SCHWADRON, *Primary Examiner.*

FRANK SUSKO, *Examiner.*